Patented Apr. 21, 1925.

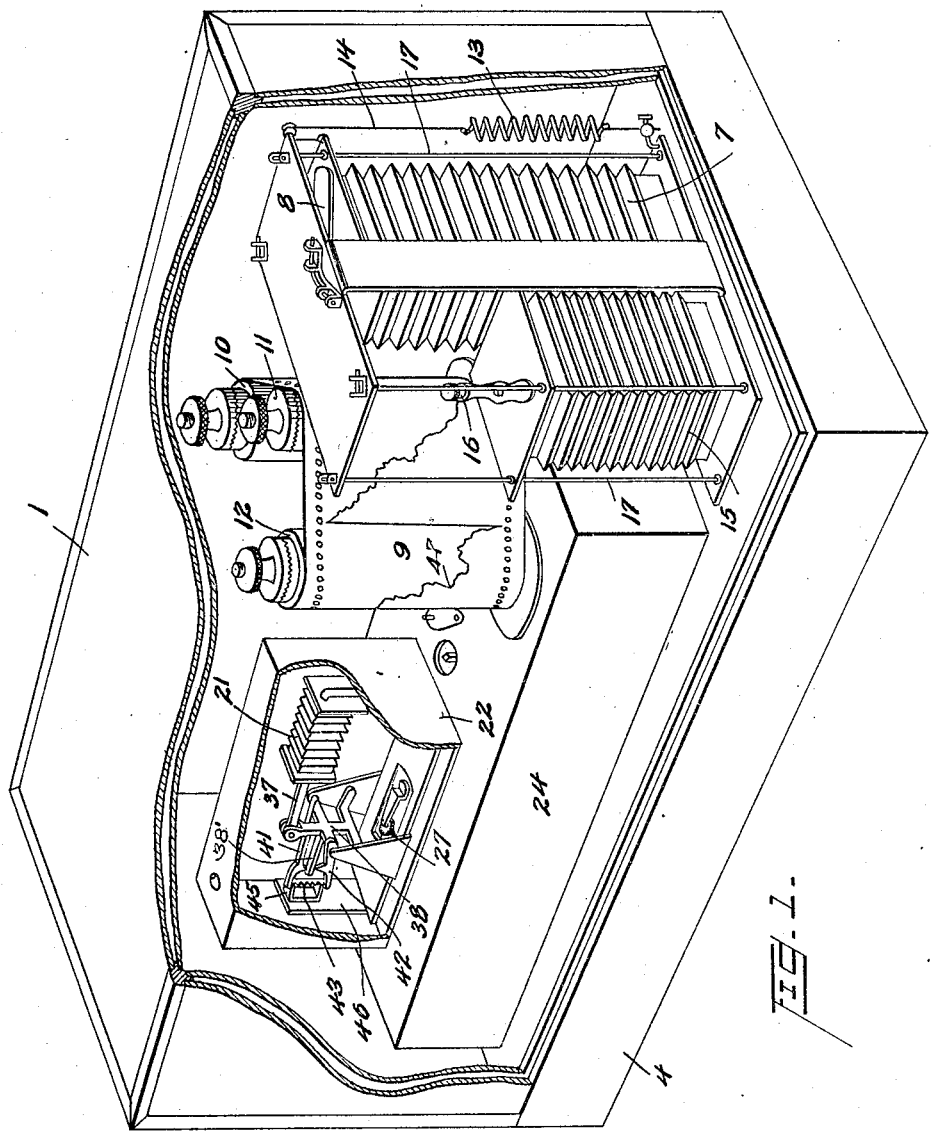

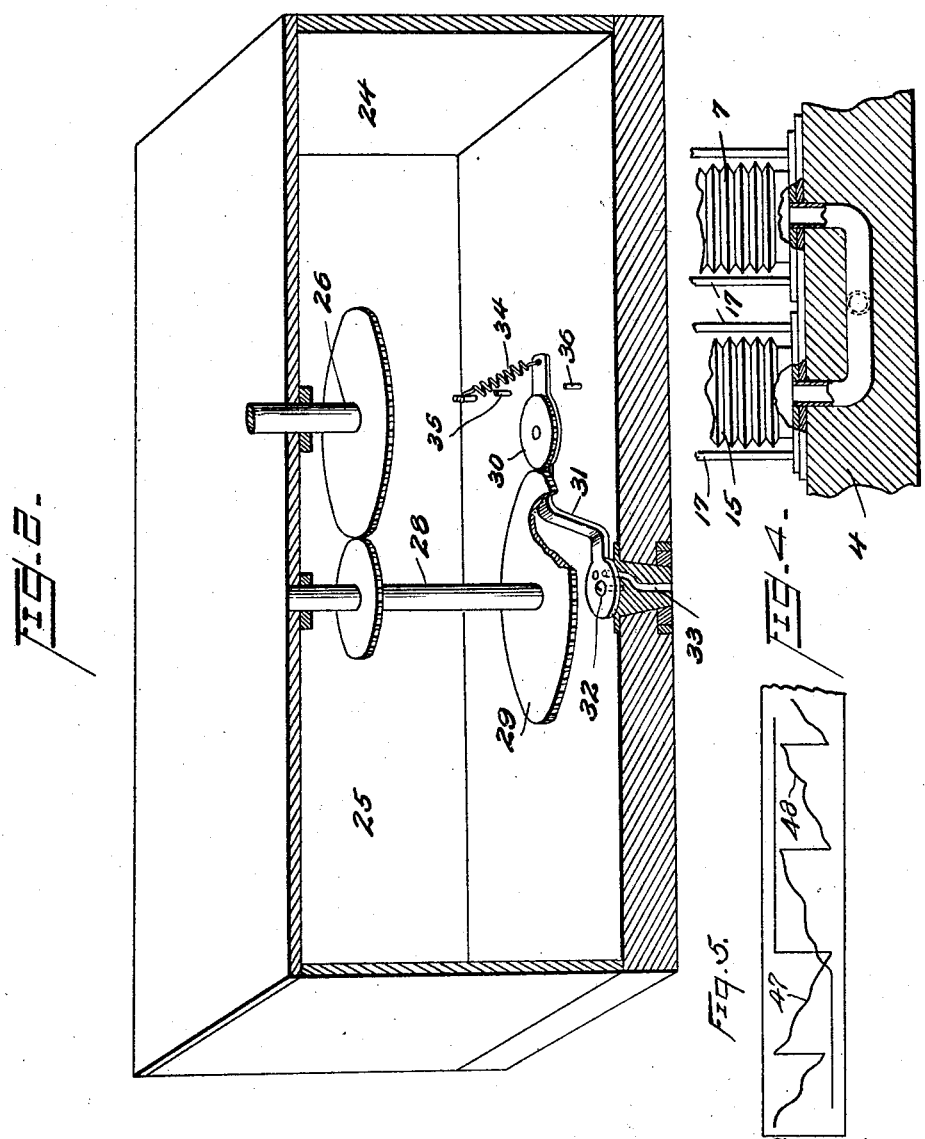

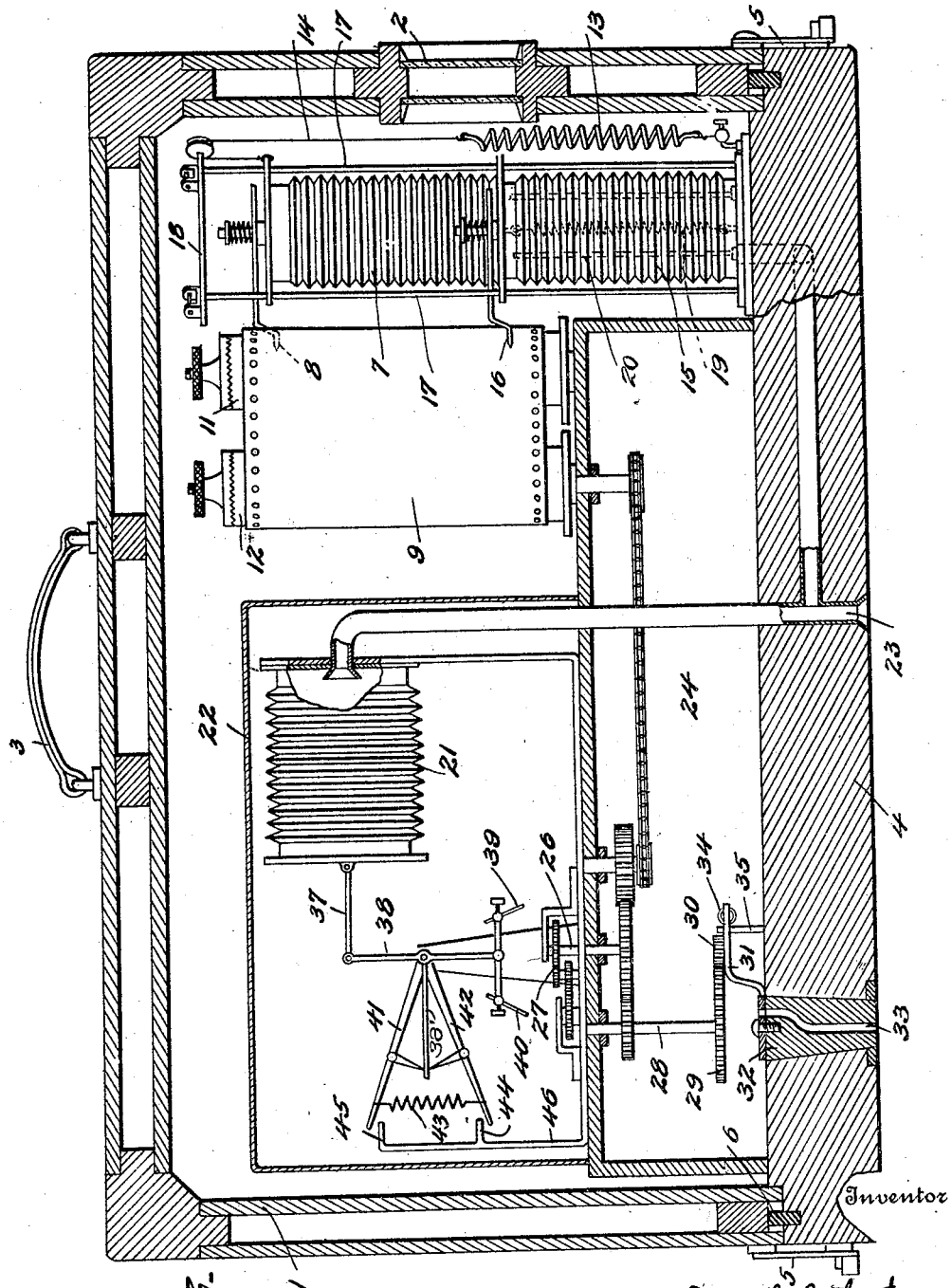

1,534,306

UNITED STATES PATENT OFFICE.

GEORGE DE BOTHEZAT AND IVAN I. EREMEEFF, OF DAYTON, OHIO.

BAROGRAPH.

Application filed March 9, 1922. Serial No. 542,515.

*To all whom it may concern:*

Be it known that we, GEORGE DE BOTHEZAT and IVAN I. EREMEEFF, citizens of Russia, residing at Dayton, in the county of Montgomery and State of Ohio, have invented certain new and useful Improvements in Barographs, of which the following is a specification.

This invention relates to barographs, the broad object in view being to produce a more sensitive and therefore more accurate barograph for recording the altitude either while ascending or descending. The mechanism operates with a step by step action; in other words the stylus after traversing the width of the record sheet is automatically and quickly returned to the starting position and immediately thereafter begins to trace another record across the sheet, this step by step operation being maintained throughout the entire flight.

A further object in view is to provide the construction involving the use of two styluses, one for recording the altitude during the ascending and the other for recording the altitude during the descent of the aircraft upon which the barograph is used.

With the above and other objects in view the invention consists in the novel construction, combination and arrangement herein fully described, illustrated and claimed.

In the drawings:

Figure 1 is a perspective view of the barograph with certain parts broken away to better illustrate the contained mechanism;

Figure 2 is an enlarged broken perspective view, showing the casing containing the motor and valve mechanism; and Figure 3 is a vertical longitudinal section through the barograph.

Fig. 4 is a detail partly in section showing the connection between the bellows.

Figure 5 illustrates the records made on the record sheet.

In the preferred embodiment of this invention we employ an airtight thermally insulated casing 1 which is shown as of double wall construction, the same being provided with a double glazed window 2 at a suitable point to observe the readings on the record sheet. The casing is equipped with a carrying handle 3 and one of the walls of the casing, as for example the bottom or base 4, is adapted to be removed from the remainder of the casing against which it is tightly held by one or more fastening devices 5, a rubber packing gasket or strip 6 being employed to prevent leakage of air into the casing.

Enclosed within the casing is a bellows 7 which is opened to the atmosphere and is also sensitive to a decrease in pressure. When the pressure decreases, the bellows 7 contracts and thereby actuates a stylus 8 which traces a record upon a record sheet 9 wound upon a roller 10 and passing around a guide roller 11, and thence upon a motor driven winding roller or reel 12, the record sheet being wound upon the last named roller or reel after the record is traced thereon by the styluses. A spring 13 having a flexible connection 14 attached thereto and to the head of the bellows 7 serves to restore said bellows to its neutral position when atmospheric pressure is admitted to the casing 1 as will hereinafter appear.

Another bellows 15 is enclosed within the casing 1 and is opened to the atmosphere. The bellows 15 is sensitive to an increase in pressure causing the bellows to expand and thereby actuate a second stylus 16 also adapted to trace a record on the sheet 9. The bellows 7 and 15 are fixedly secured at their lower ends to the base 4 while the upper ends or heads thereof are adapted to move in order to actuate the styluses, said heads engaging parallel guides 17, such as wires or rods, extending from the base 4 to an overhead support or yoke 18. One or more springs 19 inside of the bellows 15 serve to restore the last named bellows to its neutral position when atmospheric pressure is admitted to the casing 1. Stops 20 limit the movements of the heads of the bellows.

A third bellows 21 is enclosed within the casing 1 and is surrounded by a dustproof shell 22. The bellows 21 is sensitive to both decrease and increase in pressure and serves to control the motor hereinafter described and it also controls the valve employed to admit atmospheric pressure to the casing 1 periodically. 23 designates an air inlet passage having branches communicating with the three bellows 7, 15 and 21 hereinabove referred to. It will, therefore, be seen that the three bellows are always freely open to atmospheric pressure.

The lower portion of the interior of the casing 1 is partitioned off to form a motor and valve chamber 24 containing a spring motor 25, one shaft 26 of which extends through the top of the chamber 24 and actuates an escapement wheel 27 located in the shell 22. Another shaft or arbor 28 of the motor carries a gear wheel 29 with which a smaller gear or pinion 30 meshes. The pinion 30 is journaled on a valve operating arm 31 controlling a valve 32 which opens and closes a port 33 extending through a base of the casing 1, as best illustrated in Figure 2. The arm 31 is normally held open by means of a contractile spring 34 but as soon as the motor starts its operation, the friction between the gears 29 and 30 causes the tension of the spring 34 to be overcome and the arm 31 is swung from a stop 35 confining the open position of the valve to another stop 36. In the last named position the valve 32 is closed so that outside atmospheric pressure is cut off from the interior of the casing 1.

The bellows 21 has at its movable end a projecting stem 37 having a jointed connection with a T-shaped lever 38. The opposite ends of the head at the lower end of the lever 38 carries stop fingers 39 and 40, each of which is adapted to engage the escapement wheel 27 and stop the motor. Lever 38 is provided with a projecting arm 38' which is engaged by projection on arms 41 and 42 which are pivoted on the same shaft as lever 38. The arms 41 and 42 are connected by an interposed coil spring 43 and also engage projections 44 and 45 on a bracket arm 46 inside of the shell 22. The spring 43 acts to return the lever 38 to a neutral position when it is swung in one direction or the other for the purpose of stopping the motor. Thus the bellows 21 either under decreased or increased pressure therein serves to control the motor and by controlling the motor, or in other words by stopping the motor, the valve 31 is allowed to be moved to its open position by the action of the spring 34. When the motor is again released by the operation of the bellows 21, the motor starts and immediately thereafter the valve 32 is closed in the manner and by the means above described.

The working parts of the barograph are all enclosed in an air tight thermally insulated case. The bellows 7 records the decrease in pressure as a higher altitude is attained. The bellows 15 records an increase in pressure during the descent of an aircraft. The bellows 21 controls the automatic valve and the motor which may consist of an ordinary clock mechanism, the function of the valve being to admit outside atmospheric pressure to the inside of the case periodically. The relation between the bellows 7, 15 and 21 is such that when the bellows 7 and 15 have reached the limits of their movement, the bellows 21 has also been contracted or extended, as the case may be, to such an extent that it operates the lever 38 to stop the motor, thus allowing the valve 32 to open. When the pressure on the inside of the casing balances the atmospheric pressure, the bellows 21, 15 and 7 will return to their neutral positions due to the action of springs 43, 19 and 13, respectively, and the motor will operate again to close the valve 32 and rotate the drum 12. The record sheet 9 is intermittently driven by means of the motor through the operation of the shaft 26. It will be remembered that all of the bellows are always in communication with outside atmosphere.

The bellows 7 is arranged to operate only on a decrease of atmospheric pressure. When the atmospheric pressure and the pressure inside the casing is balanced, the spring 13 operates to extend the bellows to its normal position. Upon ascending, the atmospheric pressure decreases and the bellows 7 contracts, due to the excess pressure inside of the casing overcoming the action of the spring, thus tracing a record 47 on the record sheet (see Fig. 1). At the same time bellows 21 contracts and when a predetermined pressure is reached, that is when the stylus operated by the bellows 7 reaches the bottom of the record sheet, the motor is stopped by the mechanism above described and when the motor stops, the automatic valve 32 is opened by means of the spring 34. The pressure inside of the casing 1 is thus reduced to the pressure outside of the casing and within the three bellows. Bellows 7 expands to its normal position by the aid of the spring 13 and the bellows 21 is also returned to its neutral position by the aid of the spring 43. The cycle is then repeated. When descending the outside pressure increases above the pressure inside of the casing 1. The bellows 15 and 21 are thus expanded until the stylus controlled by the bellows 15 reaches the top of the drum. At this time the escapement wheel 27 is again stopped by the mechanism above described. As in the previous case, the automatic valve 32 is opened and the record sheet is stopped. The pressure inside of the casing 1 is then increased to the outside atmospheric pressure. The bellows 21 then contracts, the escapement is released, the motor starts, and the valve 32 is closed. As shown in Fig. 5 the record 47 is made when the bellows 7 operates on ascending and the record 48 is made when the bellows 15 operates in descent.

What we claim is:

1. In a barograph, an air-tight casing, a movable record sheet, a motor to actuate the record sheet, a bellows in said casing interiorly open to the atmosphere and adapted to contract under decreased pressure, another bellows in said casing interiorly open to the atmosphere and adapted to expand under increased pressure, recording styluses arranged to be actuated by both of said bellows, a motor-controlling bellows in said casing also interiorly open to the atmosphere and adapted at a predetermined pressure to stop the motor, and a valve for admitting atmospheric pressure to said casing controlled by the motor-controlling bellows.

2. In a barograph, an air-tight casing, a movable record sheet, a motor to actuate the record sheet, a bellows in said casing interiorly open to the atmosphere and adapted to contract under decreased pressure, another bellows in said casing interiorly open to the atmosphere and adapted to expand under increased pressure, recording styluses arranged to be actuated by both of said bellows, a motor-controlling bellows in said casing also interiorly open to the atmosphere and adapted at a predetermined pressure to stop the motor, a valve for admitting atmospheric pressure to said casing controlled by the motor-controlling bellows, and means to restore the several bellows to neutral position.

3. In a barograph, an air tight casing, a movable record sheet, a motor to actuate the record sheet, a bellows in said casing interiorly open to the atmosphere and adapted to contract under decreased pressure, another bellows in said casing interiorly open to the atmosphere and adapted to expand under increased pressure, recording styluses arranged to be actuated by both of said bellows, a motor-controlling bellows in said casing also interiorly open to the atmosphere and adapted at a predetermined pressure to stop the motor, a valve for admitting atmospheric pressure to said casing controlled by the motor-controlling bellows; and means to restore the several bellows to neutral position release the motor and close the valve.

4. In a barograph, a bellows sensitive to decrease in pressure, another bellows sensitive to increase in pressure, recording means controlled by both of said bellows, a third bellows sensitive to both decrease and increase in pressure, an air-tight casing enclosing all of said bellows, and a valve to admit atmospheric pressure to said casing controlled by said third bellows.

In testimony whereof we affix our signatures.

Dr. G. de BOTHEZAT.
IVAN I. EREMEEFF.